United States Patent [19]

Liebler

[11] Patent Number: 5,341,311

[45] Date of Patent: Aug. 23, 1994

[54] METHOD AND APPARATUS FOR LIMITING THE CAPACITY OF A HYDROSTATIC MACHINE

[75] Inventor: Gerold Liebler, Erlenbach, Fed. Rep. of Germany

[73] Assignee: Mannesmann Rexroth GmbH, Lohr/Main, Fed. Rep. of Germany

[21] Appl. No.: 862,347

[22] Filed: Apr. 2, 1992

[30] Foreign Application Priority Data

Apr. 9, 1991 [DE] Fed. Rep. of Germany ....... 4111500

[51] Int. Cl.$^5$ .............................................. F04B 49/06
[52] U.S. Cl. ........................................ 364/510; 60/448; 60/452
[58] Field of Search ................... 364/509, 510, 494; 60/448, 452

[56] References Cited

U.S. PATENT DOCUMENTS

| | | | |
|---|---|---|---|
| 4,474,104 | 10/1984 | Creffield | 91/497 |
| 4,712,376 | 12/1987 | Hadank et al. | 60/427 |
| 4,845,950 | 7/1989 | Metzner | 60/448 |
| 5,070,695 | 12/1991 | Metzner | 60/448 |
| 5,193,342 | 3/1993 | Omberg et al. | 60/426 |

Primary Examiner—Thomas G. Black
Assistant Examiner—Michael Zanelli
Attorney, Agent, or Firm—Emrich & Dithmar

[57] ABSTRACT

The present invention relates to a hydraulic secondary control system comprising a hydrostatic machine as a secondary unit which is connected to a pressure line in which an impressed pressure of approximately constant value is generated by a hydrostatic machine as a primary unit. The volume capacity of the secondary unit determines the torque delivered to a load and the torque needed by the load determines the speed of the secondary unit. When the desired speed and thus the volume capacity of the secondary unit is too high, the capacity exceeding the capacity of the primary unit supplying the pressure line, the pressure breaks down. To prevent this, the present invention provides to calculate a permissible capacity as defined by the rotary angle for the secondary unit in accordance with the nominal quantities of the primary and secondary unit. When the rotary angle of the secondary unit will be increased beyond the permissible value, the capacity is limited so that the volume of the secondary unit does not exceed the permissible value, thus maintaining the impressed pressure in the pressure line.

7 Claims, 1 Drawing Sheet

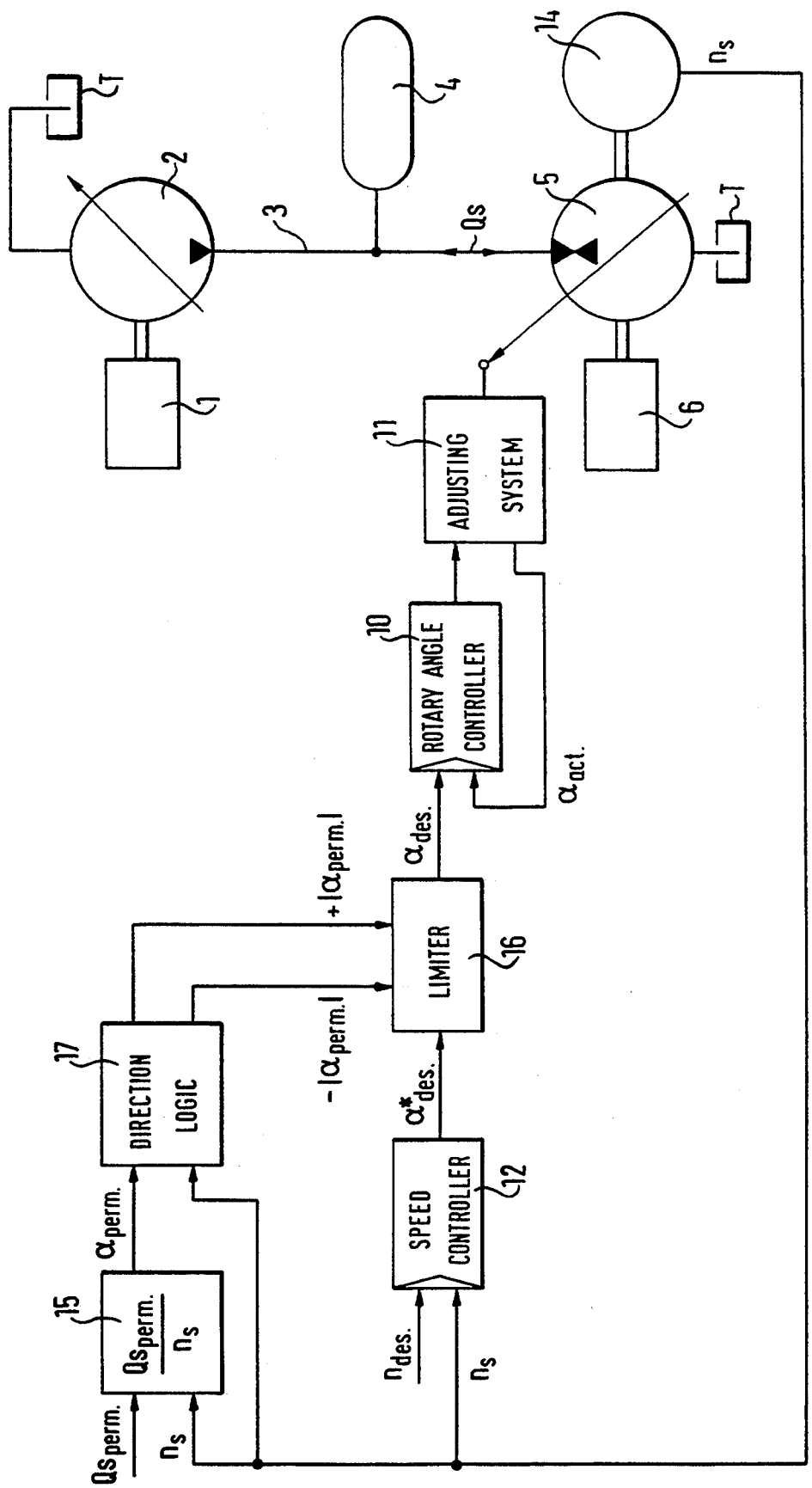

METHOD AND APPARATUS FOR LIMITING THE CAPACITY OF A HYDROSTATIC MACHINE

BACKGROUND OF THE INVENTION

1. Field of the Invention

The present invention relates to a method and an apparatus for limiting the capacity of at least a hydrostatic machine.

2. Description of the Prior Art

A secondary control system basically comprises a primary unit, i.e. a hydrostatic machine of an adjustable delivery volume which is operative as a pump, which machine supplies pressurized fluid to a pressure line in which an impressed pressure is maintained and comprises further a secondary unit, i.e. a hydrostatic machine of an adjustable displacement volume which is connected to the pressure line to either drive a load in being operative as a motor, or being driven by a load to be operative as a pump returning pressurized fluid into the pressure line.

The principle of the secondary control is generally based on the assumption that the pressure line has an unlimited capacity, i.e. the delivery volume of the pump or pumps supplying fluid to the pressure line is larger or at least equal to the maximum suction volume of the secondary unit or, respectively, a number of secondary units, wherein the energy for the hydraulic adjustment of the machines as well as the system efficiency is incorporated in the calculation. Pressure deviations in a predetermined range are considered to be permissible so that a so-called impressed pressure which must not necessarily always be constant is maintained in the pressure line.

However, when the maximum pump delivery capacity defining the primary capacitor is lower than the maximum volume comsumption of the secondary units, these units may suck the pressure line empty, the pressure breaks down and the speed of the secondary unit as well as the volume capacity thereof must be reduced until the primary unit can re-establish the impressed pressure.

Systems are known which are disclosed in German patent applications 34 41 185, 35 08 339 and 37 13 799 for example, in which the pressure in the pressure line is measured and the desired value for the speed adjustment is reduced as soon as the pressure starts to decrease.

In the operation of control systems of this type the volume capacity of the secondary unit resulting does not directly depend on the desired speed value, but is adjusted depending on external conditions so that the desired speed value must be continuously re-adjusted. Methods of this type which indirectly adjust the volume capacity of the secondary unit are expensive and tend to instabilities.

SUMMARY OF THE INVENTION

The object of the present invention is to avoid these drawbacks and provide an improved control for the secondary unit.

According to the invention a permissible volume capacity for the secondary unit is calculated from the nominal capacity and the speed of the primary unit, incorporating the efficiency of the system. The permissible capacity is calculated as follows:

$$Q_{szul} = n_{pmax} \cdot V_{np} \cdot \eta \qquad (1)$$
$$= Q_{pmax} \cdot \eta$$

$\alpha$ = rotary angle of the secondary unit
$ns$ = speed of the secondary unit
$np$ = speed of the pump
$Qs$ = volume capacity of the secondary unit
$Qp$ = delivery capacity of the pump
$Vns$ = nominal capacity of the secondary unit
$Vnp$ = nominal capacity of the pump
$\eta$ = efficiency of the systems including adjustment power The permissible rotary angle is calculated as follows:

$$\alpha_{zul} = \alpha_{max} \text{ for } n_s \leq n_{smax} \frac{Q_{pmax}}{Q_{smax}} \cdot \eta \qquad (2)$$

i.e. the permissible rotary angle may be adjusted up to the maximum rotary angle to adjust the maximum suction capacity of the secondary unit where a power limitation is not yet initiated. However, when the speed of the secondary unit is to be increased further, the capacity must be limited to avoid the pressure in the pressure line breaking down:

$$\alpha_{zul} = \frac{Q_{szul}}{n_s} \text{ for } n_s \geq n_{smax} \frac{Q_{pmax}}{Q_{smax}} \cdot \eta \qquad (3)$$

The permissible rotary angle for the secondary unit is thus defined by the ratio of the calculated and the thus predetermined permissible volume capacity of the secondary unit and the measured or, respectively, calculated speed of the secondary unit. This ratio is calculated and the value resulting is preferably used to limit the output signal of the governing control system in order to limit the desired value for the rotary angle adjustment of the secondary unit. The governing control system may be a speed control means, a position control means or a torque control means, depending on whether the desired value is defined by setting a speed, a position to be approached or a torque to be generated. According to the invention the rotary angle of the secondary unit and thus the suction capacity thereof is directly controlled by the actual value of the speed and the primary capacity.

A variety of preferred embodiments are outlined by the subclaims. In particular, the sub-claims relate to further features to refine the closed-loop control as well as for limiting the capacity of a plurality of secondary units and consumers.

BRIEF DESCRIPTION OF THE DRAWING

An embodiment of the present invention will now be described, by way of example, with reference to the accompanying drawing showing an analogue control system for a secondary unit.

DESCRIPTION OF THE PREFERRED EMBODIMENT

A hydrostatic machine 2 representing the primary unit driven by a prime mover 1 operates as a pump supplying pressurized fluid from a reservoir T into a pressure line 3 to which a fluid accumulator 4 and a hydrostatic machine 5 representing the secondary unit are connected. Both machines 2 and 5 are adjustable in displacement either for delivering or, respectively, absorbing fluid volume. The adjusting means is known and not shown in detail. Corresponding to the suction volume to which the secondary unit 5 is set and according to the speed of the secondary unit, the primary unit has to supply pressurized fluid into the pressure line 3 in order to maintain an impressed pressure therein. The secondary unit 5 serves to drive a load 6. Possibly, the secondary unit 5 may be driven by the load 6 and then operates as a pump to deliver pressurized fluid back into the line 3 and the accumulator 4. In addition, the pressurized fluid can be returned to the reservoir through a pressure relief valve not shown.

To adjust the rotary angle of the secondary unit, i.e. to set the suction or delivery volume of the machine 5, a rotary angle controller 10 is provided which receives a desired value as well as an actual value for the rotary angle. The output signal of the rotary angle controller 10 is delivered to a position control adjusting system 11, i.e. a control valve is actuated to deliver pressurized fluid to an adjusting cylinder to set the rotary angle of the machine 5. Rotary angle control or, respectively, position control means are known. It is referred to in the applications mentioned above.

The desired value for the rotary angle is generated in a speed controller 12 receiving a desired speed value which is manually set, for example, and an actual speed value. The actual speed value is measured in a tacho generator 14 driven by the secondary unit 5. Depending on setting the desired value of the speed, the rotary angle value delivered by the speed control means 12 may reach a value, at which the impressed pressure in the line 3 cannot be maintained although the primary unit 2 is operative with a maximum capacity.

The permissible rotary angle value defined by equation 3 may not be exceeded. This is accomplished by a calculating means 15 receiving the respective actual value of the speed and in which the permissible volume or flow capacity of the secondary unit is stored. The permissible rotary angle for the secondary unit is calculated according to equation 3 and the output signal is delivered to a limiter means 16 which is connected between the speed controller 12 and the rotary angle controller 10.

In an analogue control the calculating means 15 is structured as a analogue calculating unit and a diode limiter is used to define the limiting means 16. In a digital control the algorithm of the calculation is defined as a software function.

As soon as the speed controller 12 tries to set a rotary angle value larger than permissible, the limiter 16 is actuated. The output signal of the speed controller 12 is suppressed and the secondary unit 5 is set to the permissible volume capacity, i.e. the power limit for a constant system pressure.

The hydrostatic machines used for the secondary control are adjustable between rotary angle 0 towards full capacity in both directions for either direction of rotation; as the secondary unit may drive or be driven by the load in both directions of rotation, the secondary control affords a so-called four-quadrant operation. For this both rotary angle directions and in addition both directions of rotation must be analyzed. For this a direction logic unit 17 for analyzing the direction of rotation is provided to adjust the permissible rotary angle in response to the direction of rotation. For example, limiting the capacity can be restricted to only one of either adjusting directions depending on the rotational direction, i.e. the limitation of the capacity is accomplished only then, when the secondary unit is operative as a motor. In a generator operation, i.e. when the secondary unit is operative as a pump which is driven by the load, the delivery volume can be larger than the delivery volume of the primary unit as the excess volume flow may be returned to the reservoir by a pressure relief valve.

The algorithm above referred to for the power limit of the secondary unit is valid as long as the primary unit is operative with a maximum speed and maximum rotary angle and when a single secondary unit is provided. However, when a number of secondary units or other consumers are connected to the pressure line 3 the permissible flow capacity of each secondary unit has to be calculated and has to be correlated to the respective secondary unit wherein each secondary unit needs an individual power limiting circuit. The correlation is performed by a master computer or by pressure sensors which reduce the permissible value for the volume capacity of the secondary unit when the pressure in the line decreases.

The present invention is not limited to the power limitation of an individual single secondary unit.

I claim:

1. A method for limiting the flow capacity of a hydrostatic machine defining a secondary unit and having variable displacement volume and speed which are functions of a variable rotary angle, the secondary unit being connected to a pressure line in which an impressed pressure of an approximately constant volume is maintained by a hydrostatic machine defining a primary unit having a nominal capacity and speed, said method comprising the steps of: predetermining a permissible flow capacity of the secondary unit from the nominal capacity and speed of the primary unit, measuring the speed of the secondary unit, calculating a permissible rotary angle value for the secondary unit as the ratio of the predetermined permissible flow capacity to the measured speed of the secondary unit, and limiting the rotary angle of the secondary unit of the calculated permissible rotary angle value.

2. The method of claim 1, and further comprising the steps of generating a speed control signal corresponding to a desired rotary angle for the secondary unit, the limiting step comprising limiting the desired rotary angle for the secondary unit to the calculated permissible rotary angle value.

3. The method of claim 1, wherein the primary and secondary units have an efficiency which includes the adjustment power necessary for adjusting the rotary angle of the secondary unit, the predetermined permissible flow capacity being a function of the efficiency of the primary and secondary units.

4. The method of claim 1, including the step of determining the direction of rotation of the secondary unit, the limiting step including limiting the rotary angle in response to the direction of rotation.

5. Apparatus for limiting the flow capacity of a hydrostatic machine defining a secondary unit and having variable displacement volume and speed which are functions of a variable rotary angle, the secondary unit being connected to a pressure line in which an impressed pressure of an approximately constant value is maintained by a hydrostatic machine defining a primary unit having a nominal capacity and speed, said apparatus comprising: measuring means for measuring the speed of the secondary unit and generating a measured speed signal corresponding to the measured speed, closed loop speed control means coupled to said measuring means and to the secondary unit for generating a desired rotary angle signal for adjusting the rotary angle of the secondary unit, and calculating means coupled to said measuring means for generating a permissible rotary angle signal as a ratio of a predetermined permissible flow capacity value and the measured speed of the secondary unit, said closed loop speed control means including limiting means coupled to said calculating means for limiting the desired rotary angle signal in response to the permissible rotary angle signal.

6. The apparatus of claim 5, wherein said closed loop speed control means includes means for determining the actual rotary angle value of the secondary unit, and a rotary angle controller responsive to the actual rotary angle value and to the desired rotary angle signal for generating a control signal for adjusting the rotary angle of the secondary unit.

7. The apparatus of claim 5, and further comprising direction means coupled to said measuring means and to said calculating means and to said limiting means for determining the direction of rotation of the secondary unit and controlling said limiting means in accordance with the direction of rotation.

* * * * *